Patented Nov. 24, 1942

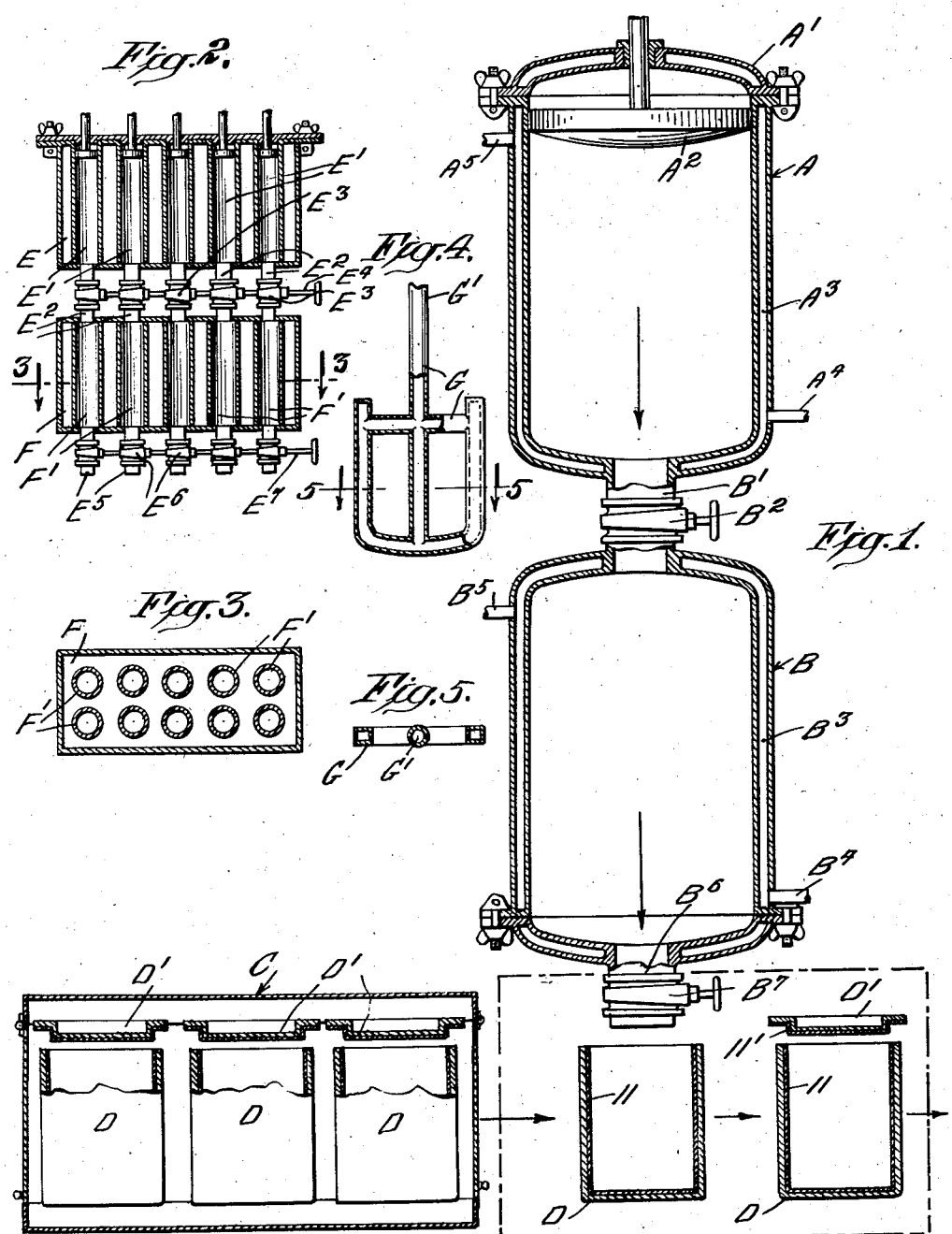

2,303,021

UNITED STATES PATENT OFFICE 2,303,021

PRESERVING PERISHABLE FOODS

Carlos Butty, New York, N. Y.

Application August 3, 1940, Serial No. 350,195

1 Claim. (Cl. 99—182)

This invention relates to a method of preserving perishable foods, particularly non-acid foods, such as meat and vegetables other than tomatoes.

The sterilization of non-acid foods requires heating at a temperature considerably above the boiling point of water. It is ordinarily effected by heating foods sealed in metal containers to a temperature of from 240° to 250° F. for a period of thirty minutes. The super-atmospheric pressure developed within the containers at such temperatures precludes the possibility of using this method for foods in paper, cardboard or other non-metallic containers.

The method of food preservation which I have invented permits the use of non-metallic containers, such for example as the lined cardboard containers of my Patents Nos. 1,989,075 and 2,133,185, for the preservation of meat and vegetables. The method involves sterilizing the food and the containers separately. The containers are sterilized by dry heat or other known methods, while the food at the same time is sterilized by heating to a temperature of from 240° to 250° F. in a closed metal kettle of sufficient strength to withstand the pressure developed by such heating. The food is then cooled to a temperature just below the boiling point, and the sterilized containers are then filled with the food at this temperature. Ebullition in the containers is thus avoided, and yet hot vapors rising from the food prevent contamination by the outside air. The food is then sealed in the containers by means of an air and moisture-proof lining. Any slight amount of entrained air remaining in the food has been sterilized and does not come in contact with any metal.

In order that my invention may be clearly understood, I will describe in detail an illustrative method of food preservation embodying it. In this description, I shall refer to the accompanying drawing which shows the various steps of the method and illustrates diagrammatically apparatus which may be used in carrying out the method.

In the drawing:

Fig. 1 is a diagrammatic view of one form of apparatus suitable for practicing the method of the invention;

Figs. 2 and 3 are vertical and horizontal sections of a modified form of apparatus; and Figs. 4 and 5 are vertical and horizontal sections of a form of stirrer, on reduced scale.

The apparatus illustrated in Fig. 1 of the drawing includes a metal pressure kettle A, a cooling kettle B and a dry heat sterilizer C. The pressure kettle A is provided with a cover $A^1$ and with a plunger $A^2$ for pushing foods which have been sterilized into the cooling kettle B. Kettle A is provided with a jacket $A^3$ through which superheated steam can be circulated by means of pipes $A^4$ and $A^5$. A passage $B^1$, adapted to be closed by a valve $B^2$, connects the sterilizing kettle A with the cooling kettle B. This latter kettle is provided with a jacket $B^3$ through which cooling water is circulated by means of pipes $B^4$ and $B^5$, and with a discharge passage $B^6$ controlled by a valve $B^7$. The dry heat sterilizer C may consist of any type of externally heated oven capable of heating its contents to, and preferably somewhat above, the boiling temperature of water.

A number of containers D having covers $D^1$ are also shown in Fig. 1. These containers and covers are made of cardboard or other non-metallic material. Each container is preferably of the type described in my Patent No. 1,989,075, and has an outer wall 10 and a lining 11 connected by a metal sealing strip so arranged that no metal is in contact with the foodstuffs within the container. The lining 11 consists of an air and moisture-proof material, preferably one which can be sealed by heat at or slightly below the temperature of boiling water. A good material for lining the containers and covers is a rubber-resin derivative sold under the trade-name "Pliowax." Preferably, the containers and covers are lined with paper, glassine or the like impregnated or coated with such derivative, or with sheet material formed of such derivative. These sheet materials are sold under the trade-names "Pliolite" and "Pliofilm." However, I do not wish to be limited to these particular materials, as other air and moisture-proof linings may be employed.

In carrying out my method by means of apparatus such as that which has been indicated, the food to be preserved is first sealed in the pressure kettle A and heated to a temperature about 230° F. or higher for a period of thirty minutes, more or less, depending on the temperature. The valve $B^2$ is then opened and the plunger $A^1$ is operated to push the food into the cooling kettle B. Cooling water is then circulated through the jacket of the cooling kettle for a period sufficient to cool the food to a temperature slightly below 212° F.

During the sterilization and cooling of the food, a number of containers D having an aggregate volume equal to that of the kettle A and their covers $D^1$ are placed in the dry heat sterilizer C, When food in the cooling kettle B has been reduced to boiling temperature, the containers D are passed under the discharge pipe of the kettle B and filled. As soon as each container is filled, its cover $D^1$ is pressed on. This results in sealing the heated lining $11^1$ of the cover to the heated lining 11 of the container so that the food is sealed against air and moisture.

Some vegetables have a tendency to settle toward the bottom of the liquid present, and it is thus difficult to obtain a uniform solids content in the several containers. In order to avoid this difficulty, I have devised an apparatus for carrying out my method, this apparatus including a series of sterilizing compartments and cooling compartments each of which is the same size as the container to be filled. Such an apparatus is shown in Figs. 2 and 3, wherein a large chamber E, adapted to hold super-heated steam, contains a number of spaced sterilized compartments $E^1$. A similar chamber F contains a series of cooling compartments $F^1$, each of which is connected to the sterilizing compartment by means of a passage $E^2$ controlled by a valve $E^3$. All of the valves may be controlled by a single stem $E^4$. The food is discharged into the containers through passages $E^5$ controlled by valves $E^6$ mounted on a single operating stem $E^7$.

In order to reduce the time required for heating a large mass of food in a kettle such as that shown in Fig. 1, I provide a stirrer G which is hollow and which has an inlet passage $G_1$ for admitting steam to the interior of the stirrer, as shown in Figs. 4 and 5. This stirrer, which is optional, may be inserted in place of the plunger in kettle A. To cool the food, water may be circulated through the stirrer and jacket of kettle A, if desired, and in this case the kettle B can be eliminated. In some cases it may be desirable to pack the foods in the containers within a closed chamber, as indicated by dotted lines in Fig. 1. Apparatus for packing foodstuffs in a vacuum or in an inert medium are well known in the art.

The use of separate sterilizing and cooling compartments produces highly efficient results in conserving heat and in making the method practically continuous. However, it will be understood that my method, according to the broader aspects of the invention, is not limited, to the use of this particular type of apparatus. Nor is the invention limited to the particular containers described in the above-mentioned patents, as other types may be employed. If desired, the food may be subjected to ultra-violet light while it is being placed in the individual containers, and before the containers have been sealed. When the foodstuffs are thus subjected to ultra-violet light, it may be practicable, in some cases, to cool the foodstuffs well below the boiling point before they are introduced into the containers.

The terms and expressions which have been employed are used as terms of description and not of limitation, and there is no intention, in the use of such terms and expressions, of excluding any equivalents of the features shown and described, or portions thereof, but it is recognized that various modifications are possible within the scope of the invention claimed.

What I claim is:

The method of preserving perishable food which comprises heating the food under pressure in one vessel to a temperature substantially above the boiling point to sterilize it, passing the sterilized food into another vessel while keeping it out of contact with outside air, cooling the food in the latter vessel to a temperature just below the boiling point, sterilizing a number of paper containers in a separate sterilizer while the food is being sterilized and cooled as stated, filling said sterilized containers with the food at said last-named temperature, whereby ebullition in the containers is eliminated, and thereupon finally sealing the containers.

CARLOS BUTTY.